(No Model.) 2 Sheets—Sheet 1.

J. O. BALL.
TIME METER FOR ELECTRIC LIGHTING SYSTEMS.

No. 488,107. Patented Dec. 13, 1892.

Witnesses;

Inventor,
Judson O. Ball,
By his Attorneys,
C. A. Snow & Co.

(No Model.) 2 Sheets—Sheet 2.

J. O. BALL.
TIME METER FOR ELECTRIC LIGHTING SYSTEMS.

No. 488,107. Patented Dec. 13, 1892.

Witnesses;

Inventor,
Judson O. Ball,
By his Attorneys,

UNITED STATES PATENT OFFICE.

JUDSON O. BALL, OF MOUNT PLEASANT, IOWA.

TIME-METER FOR ELECTRIC-LIGHTING SYSTEMS.

SPECIFICATION forming part of Letters Patent No. 488,107, dated December 13, 1892.

Application filed February 20, 1892. Serial No. 422,261. (No model.)

*To all whom it may concern:*

Be it known that I, JUDSON O. BALL, a citizen of the United States, residing at Mount Pleasant, in the county of Henry and State of Iowa, have invented a new and useful Time-Meter for Electric-Lighting Systems, of which the following is a specification.

This invention relates to time-meters, and is designed to be especially used in connection with electric-lighting systems in which it is important to know the exact time the lights are burning. This meter may also be used in connection with gas, water, or steam power for determining the length of time the power was in use by connecting the device with the cut-off devices for such power; but, as stated, the main object of this invention is to provide a cheap and simple device for producers as well as consumers of electric lights, which device will accurately and automatically register and measure the time such lights are severally and collectively in use, being designed to indicate the length of time one light or a series of lights burns, and can also time two or more series and keep the time of each series of lights distinct and separate. To this end it is the main object, also, to simplify and improve the construction of similar devices.

With these and other objects in view, which will appear as the nature of the invention is better understood, the same consists in combining with an ordinary clock mechanism single or separate adjustable time-registering devices, which are so regulated that the closing of the electric circuit releases the mechanism of the clock and starts the register or registers and the opening of the same, which extinguishes the lights, stops the timekeeper, or at least the registering device thrown out of engagement with the clock.

Figure 1:
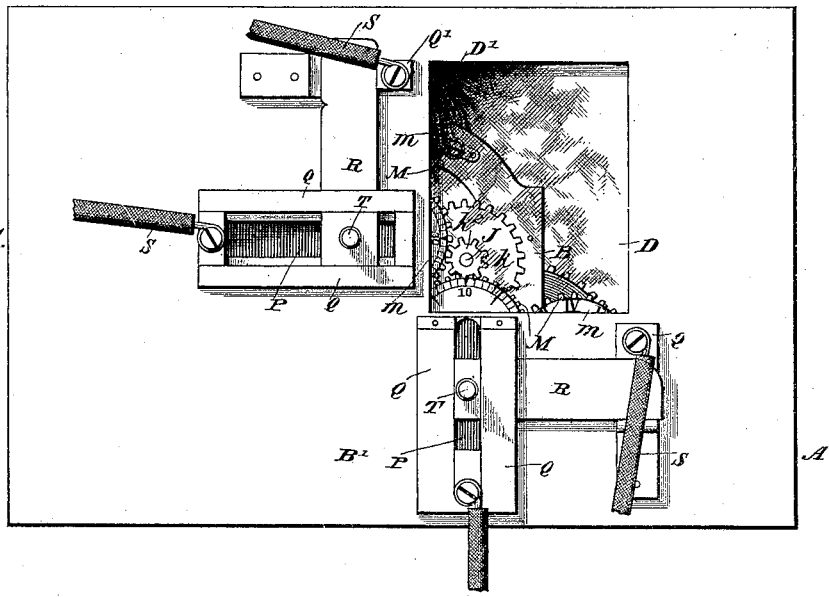
Figure 2:
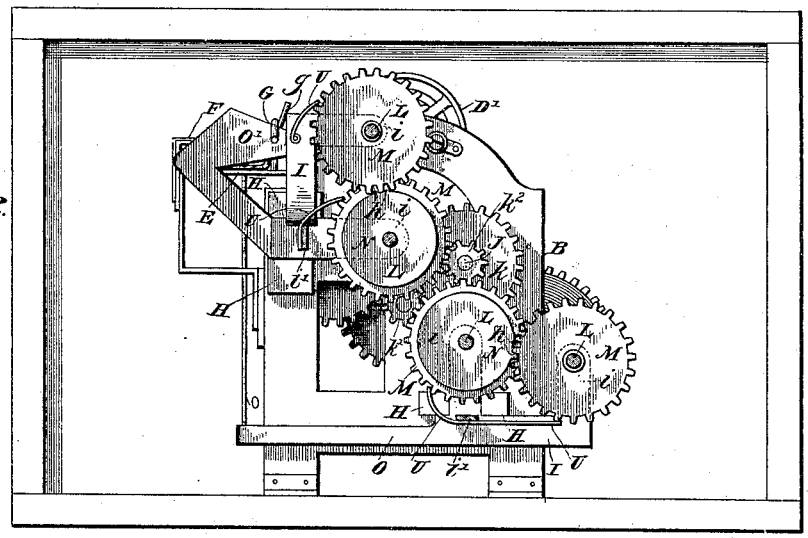
Figure 5:
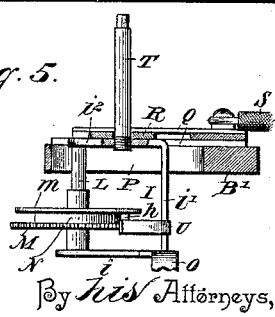
Figure 3:
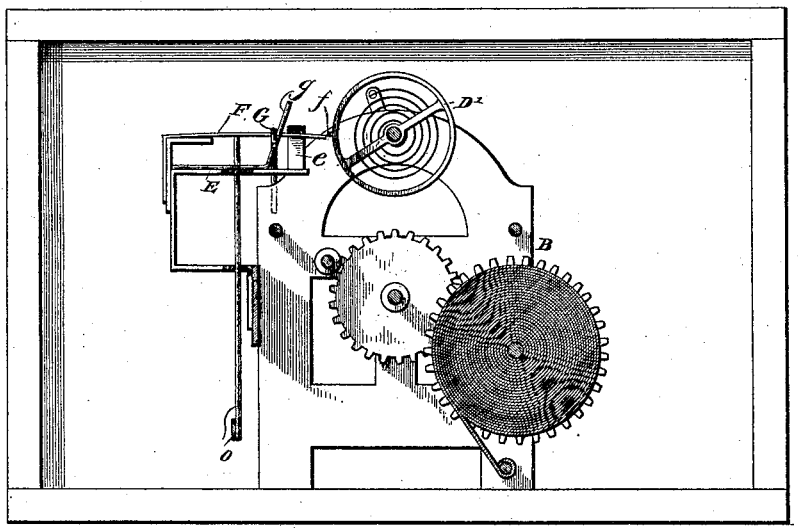
Figure 4:
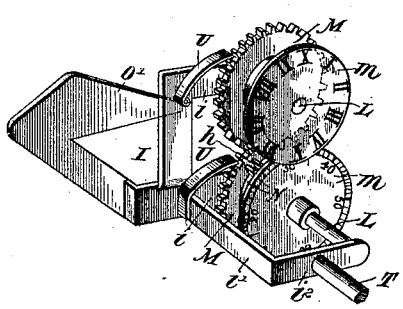

In the accompanying drawings, Figure 1 is a front elevation of a clock mechanism provided with an attachment as contemplated by this invention. Fig. 2 is a vertical sectional view in front of the clock-frame. Fig. 3 is a similar view taken centrally therethrough. Fig. 4 is a detail in perspective of one of the sliding registering devices. Fig. 5 is a detail sectional view illustrating the connection of one of the sliding switches with one of said registering devices.

Referring to the accompanying drawings, A represents a suitable casing, in which is located and mounted an ordinary clock mechanism B, said casing being inclosed and capped by the cover B', having an ordinary face or observation opening D, by means of which the registering devices may be easily seen. Secured to the clock-mechanism frame, to one side of the balance-wheel D', which projects slightly without the same, is a supplemental attachment arm or plate E, which is provided with the yoke e, which receives and accommodates the inwardly-extending leaf-spring F. Said leaf-spring F is secured at one end to said arm and projects inward under the yoke e, beyond the inner edge of said arm and in close proximity to the periphery of the balance-wheel D', and in its normal position, as held by the upwardly-extending spring-arm G, is designed to be engaged by the stop stud or pin f, secured in the periphery of said balance-wheel and which engages over the outer end of said spring when the balance-wheel is away from its center of motion, so that when said spring is thrown out of the travel of said stop stud or pin the balance-wheel will immediately begin to oscillate and start the clock. The upwardly-extending spring-arm G is adapted to work over the inclined spring guide-arm g and is adapted to normally hold the leaf-spring F in the path of the travel of said balance-wheel stud, as stated, and when it is desired to start the clock mechanism the said spring is thrown out of the path of travel of said stop stud or pin by the registering devices to be presently described. It may be noted that instead of employing a stop stud or pin the said balance-wheel may be provided with a notch engaged by the free end of the spring F or a pin in said spring, according to the option of the manufacturer.

The front of the clock-mechanism frame is provided with the guide-blocks H, which are designed to accommodate the sliding and adjustable time-registering devices I, which are adapted to be slid over the face of said frame between said guides by the electric switch or cut-off devices and be thrown into mesh with the timekeeper when the circuit is regulated by said cut-offs or switches. Mounted upon a stub-shaft J, projecting from said framework, is the cog-wheel $k$, meshing with the hand-arbor pinion $k'$ and itself provided with a pinion $k^2$, which engages the registering devices as they are thrown in contact therewith. Such construction is used; but it may be noted that the said registering device may be thrown into direct mesh with the hand-arbor pinion. Each of the registering devices I comprises a suitable frame having the projecting supporting-arms $i$, each of which carries the stub-shafts L, and one of which arms is adapted to slide within the guides H, located upon the clock-mechanism frame, to allow the said device to be thrown in and out of gear with the clock mechanism. The said registering-device frame is further provided with the outwardly-extending arm $i'$, to the top of which is secured the cap-plate $i^2$, the outer end of which receives the outer end of one of said stub-shafts and is designed to be connected with the switch devices, to be presently noted. The registering devices are provided with the indicating cog-wheels M, each of which carries the indicating-dials $m$ to indicate hours and minutes or any period of time desired; but they do not mesh with each other. The cog-wheel M upon the stub-shaft carried by the sliding arm of said registering device is designed to be thrown in and out of mesh with the pinion $k^2$ when the electric cut-off or switch is moved, and said wheel also carries the disk N, provided with the fingers $h$, which at every revolution of said cog-wheel carrying the same are designed to engage the adjacent cog-wheel upon the adjacent stub-shaft and move the same one point to register one revolution of the adjacent dial to indicate one hour or every twelve hours, as the case may be and according to whether the device is geared directly to the hour or minute hand arbor. The said registering devices, which may be arranged in any number upon the clock-mechanism framework, according to the number of different lights or series of lights to be independently and collectively timed, are provided with suitable devices for releasing the balance-wheel when in gear with the clock mechanism or to allow the same to be caught and held when not in use. It will of course be seen that the first registering device thrown into engagement with the clock mechanism sets the mechanism off, while the other devices may or may not be used at the time, and that the last registering device thrown out of engagement with the mechanism causes the leaf-spring F to be released and hold the clock mechanism.

As illustrated in the drawings, two registering devices are employed, one of which registering devices, which is located in such position as to slide to and away from the leaf-spring F, has connected therewith an extended arm O, passing through the attachment arm or plate E and designed to work between said arm and the leaf-spring F, so that as the said registering device or attachment is thrown in mesh with the pinion $k^2$ the spring F will be thrown out of the path of the balance-wheel to release the same, while the opposite will be the effect when the registering device is slid out of gear. The other registering device I, which moves in a line with the disposition of said leaf-spring F, is provided with an inclined head O', the upper edge of which bears under the upwardly-extending and downwardly-pressing spring-arm G, and as said device is thrown in connection with the clock mechanism said inclined head moves under the said spring-arm, which rises up and over said inclined head and over the inclined guide-arm $g$, and thereby rises sufficiently far to allow the spring F to also rise and disengage itself from the balance-wheel stud, while, on the contrary, the opposite operation allows the spring F to be forced down by the arm G and into engagement with the balance-wheel. Various mechanical devices will be found expedient to release the clock mechanism by the sliding registering devices that will be apparent. The cap-plates $i^2$ of each of the registering devices I are designed to work in the slots P, formed in the cap or cover B. Mounted over said slots P are the electric-switch-guide plates Q, carrying the sliding cut-offs R, which are designed to close and open the circuit of the wires S, connected with said guide-arms, in which said cut-offs work, and the contact-plates Q', as will be apparent. The said switch-arms R are controlled by the posts T, passing therethrough and connected with cap-plates $i^2$, so that when the electric circuit is closed the movement will throw the registering device in mesh with the clock mechanism, while at the same time releasing the clock mechanism. The various switches control the several registering devices connected therewith, and the operation of all is identical; but, as previously stated, it may be again noted that it is immaterial whether one, two, or more registering devices are used at the same time, inasmuch as the construction is such as to allow a simultaneous registering of all the connections used.

It is of course to be seen that suitable leaf-springs U bear upon said cog-wheels M and steady the same and insure accuracy in registering.

While I have described, specifically, the construction of the herein-described time-meter, I would nevertheless have it understood that I do not wish to exclusively confine myself to such details, but reserve the right to make such changes or modifications as may be found necessary without departing from the spirit of my invention.

Having thus described my invention, what I claim, and desire to secure by Letters Patent, is—

1. In a time-meter, the combination, with an ordinary clock mechanism, of a movable registering device and a cut-off connected with said registering device and adapted to throw the same into engagement and out of engagement with the clock mechanism when the electric circuit is closed or opened, respectively, substantially as set forth.

2. In a time-meter, the combination, with the balance-wheel and the hand-arbor of a clock mechanism, having a pinion, of a sliding registering device mounted to slide upon the clock-mechanism frame and means for engaging and disengaging the said registering device with said arbor-pinion and stopping and starting the balance-wheel at a point away from its center of motion, substantially as set forth.

3. In a time-meter, the combination, with the clock mechanism having a balance-wheel and a hand-arbor provided with a pinion, of a spring-arm secured adjacent to said balance-wheel and adapted to normally engage and check the same at a point away from its center of motion, a registering device mounted to slide upon the clock-mechanism frame and connected with said spring-arm, and a sliding cut-off or switch connected with said registering device, substantially as set forth.

4. In a time-meter, the combination, with a balance-wheel and a hand-arbor of a clock mechanism, said arbor having a pinion, of a spring-arm adjacent to said balance-wheel and adapted to normally engage and check the same at a point away from its center of motion, registering devices mounted to slide upon the clock-mechanism frame to and from said arbor-pinion, and connected independently with said spring-arm, and sliding cut-offs or switches connected with said registering devices, substantially as set forth.

5. In a time-meter, the combination, with the clock mechanism having a balance-wheel and a hand-arbor provided with a pinion, of a spring-arm secured adjacent to said balance-wheel and adapted to normally engage and check the same at a point away from its center of motion, a registering device mounted to slide upon the clock-mechanism frame and provided with opposite stub-shafts, dial-carrying non-meshing cog-wheels mounted on said shafts, a disk carried by one of said cog-wheels and provided with fingers engaging the other cog-wheel at every revolution, said registering device being connected with said spring-arm, and a sliding electric switch connected with said registering device, substantially as set forth.

6. In a time-meter, the combination, with the box or casing having a slot and the clock mechanism having a balance-wheel and a hand-arbor provided with a pinion, of a spring-arm adjacent to said balance-wheel and normally engaging and checking the same at a point away from its center of motion, a registering device sliding upon the clock-mechanism frame and provided with opposite stub-shafts, dial-carrying non-meshing cog-wheels mounted on said shafts, a disk carried by one of said cog-wheels and provided with fingers engaging the other cog-wheel at every revolution, a cap-plate working in said slot, and a sliding electric switch working over said slot and connected with said cap-plate, substantially as set forth.

In testimony that I claim the foregoing as my own I have hereto affixed my signature in the presence of two witnesses.

JUDSON O. BALL.

Witnesses:
L. G. PALMER,
HENRY MELCHER.